United States Patent [19]

Higgins et al.

[11] 4,439,594

[45] Mar. 27, 1984

[54] CURABLE EPOXY RESIN COMPOSITIONS

[75] Inventors: William A. Higgins, Gates Mills; Alan C. Clark, Mentor, both of Ohio

[73] Assignee: The Lubrizol Corporation, Wickliffe, Ohio

[21] Appl. No.: 420,171

[22] Filed: Sep. 17, 1982

[51] Int. Cl.³ .................. C08G 59/68; C08G 59/40
[52] U.S. Cl. ............................. 528/89; 525/505; 528/108; 528/99; 528/111; 528/373; 528/407; 528/414; 252/182; 260/934
[58] Field of Search ............ 528/89, 108, 111, 99, 528/373, 407, 414; 525/335, 341, 505; 252/182; 260/934

[56] References Cited

U.S. PATENT DOCUMENTS 3,242,130  3/1966  Jackopin ..................... 528/89 X
3,264,273  8/1966  Greenlee ..................... 528/89 X

OTHER PUBLICATIONS

Lee & Neville, "Handbook of Epoxy Resins", McGraw-Hill, New York, 1967, pp. 2-3 and 2-4, TP1180 E6L4.

*Primary Examiner*—Earl A. Nielsen
*Attorney, Agent, or Firm*—D. A. Polyn; R. F. Keller

[57] ABSTRACT

Curable compositions of matter comprising an epoxy resin and a curing agent selected from the group consisting of polyvalent metal salts of a phosphorodithioic acid, the acid being derived from the reaction of a phosphorus sulfide with a hydroxyl containing aromatic compound, and products derived from the reaction of the polyvalent metal salt with a mono- or polyamine.

44 Claims, No Drawings

CURABLE EPOXY RESIN COMPOSITIONS

FIELD OF THE INVENTION

This invention relates to curable compositions of matter. More particularly this invention relates to curable epoxy resin compositions, to the novel curing agents employed therein and to a method of curing epoxy resins utilizing said novel epoxy curing agents.

BACKGROUND OF THE INVENTION

Curable epoxy resins are well-known in the industry today, their commercial exploitation having its beginnings in the late thirties and early forties with the discovery of various methods and agents for converting the usually viscous liquid or brittle solid intermediate epoxide into a useful end product. In the United States one of the earliest disclosures covering the curing of epoxides was U.S. Pat. No. 2,324,483 (1943) wherein is described the curing of phenolic epoxide resins with dibasic acids. Since that time a wide variety of curing agents have been discovered which will affect the conversion of the liquid or solid epoxide into a useful end product.

These curing agents generally fall into one of two categories known as catalysts and reactive hardeners. In the former the agent functions to initiate the polymerization creating direct linkages between the many intermediate molecular weight epoxy molecules. Curing agents falling within the catalyst classification include bases such as tertiary amines and acidic materials such as boron trifluoride and amine complexes thereof. In the latter classification, i.e., reactive hardeners, are included various amine compounds such as aliphatic amines as represented by ethylenediamine (EDA), diethylenetriamine (DETA) and higher members of this series; hydroxy aliphatic amines such as N-(hydroxyethyl)diethylenetriamine; acrylonitrile adducts of primary-secondary aliphatic amines; primary-tertiary aliphatic amines such as diethylaminopropylamine; cyclic secondary amines such as piperidine; aromatic primary amines such as m-phenylenediamine; phenolic tertiary amines such as (dimethylaminomethyl)phenol and salts thereof such as the 2-ethylhexoic acid salt and acid anhydrides representative of which include phthalic anhydride, pyromellitic dianhydride, dodecylsuccinic anhydride and hexahydrophthalic anhydride to name but a few. The most frequently employed curing agents are those that function as reactive hardeners and, of these, the amine based curing agents are the most widely used.

Although literally hundreds of curing agents have been tried or claimed, there still remains a need for curing agents which will effect the curing of epoxy resins to provide useful end products exhibiting good thermal properties and good moisture and chemical resistance characteristics, and there is particularly a need for curing agents which, when blended with epoxy resins, will provide mixtures exhibiting extended useful potlife. Thus, it is an object of this invention to provide novel curable compositions comprised of an epoxy resin and a novel epoxy curing agent. It is a further object of this invention to provide novel curing agents for epoxy resins which, when mixed with said resins, provide curable compositions exhibiting extended useful potlife. It is a further object of this invention to provide a method of curing epoxy resins employing the novel curing agents herein described. These and other objects will become apparent to those skilled in the art upon the reading of the following descriptions and disclosures.

SUMMARY OF THE INVENTION

The invention as described hereinbelow comprises curable epoxy resin compositions comprising a mixture of an epoxy resin and (A) a polyvalent metal salt of a phosphorodithioic acid prepared by the reaction of a phosphorus sulfide with hydroxyl containing compounds of the general formula

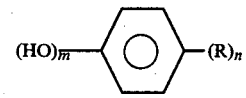

wherein R is hydrogen or a hydrocarbon-based substituent containing from about 1 to about 100 carbon atoms; m is an integer ranging from 1 to about 3 and n is an integer ranging from 1 to about 5 and the sum of m+n does not exceed 6. It further comprises curable epoxy resin compositions comprising a mixture of an epoxy resin and the reaction product of the polyvalent metal salt of a phosphorodithioic acid (A) defined above with an amine compound (B) corresponding to the general formula

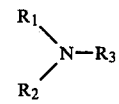

wherein each of $R_1$ and $R_2$ is independently hydrogen or a radical selected from the group consisting of hydrocarbon-based radicals containing from 1 to about 20 carbon atoms and hydroxyl-substituted hydrocarbon based radicals containing from 2 to about 20 carbon atoms, $R_3$ is independently hydrogen or a radical selected from the group consisting of the radicals $R_1$ and $R_2$ and the radical

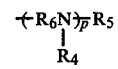

wherein each of $R_4$ and $R_5$ is independently hydrogen or a radical selected from the group consisting of the radicals $R_1$ and $R_2$, $R_6$ is a divalent hydrocarbon based radical containing from 1 to about 18 carbon atoms and p is an integer ranging from 1 to about 10.

The curing agents prepared by the reaction of polyvalent metal salts of a phosphorodithioic acid with the amine compounds as well as a method for curing epoxy resins with the curing agents defined herein are also included in this invention.

DETAILED DESCRIPTION OF THE INVENTION

The epoxy resins useful in the present invention include any one of a number of well-known organic resins which are characterized by the presence therein of the epoxide group

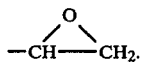

In the last decade, a wide variety of such resins have become available commercially.

Such resins have either a mixed aliphatic-aromatic or an exclusively non-benzenoid (i.e., aliphatic or cycloaliphatic) molecular structure.

The mixed aliphatic-aromatic epoxy resins which are preferred for the purpose of the present invention are generally prepared by the well-known reaction of a bis(hydroxyaromatic)alkane or a tetrakis-(hydroxyaromatic)-alkane with a halogen-substituted aliphatic epoxide in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time. The following equations, using for purposes of illustration, epichlorohydrin and 2,2-bis(p-hydroxyphenyl)propane as reactants, while not necessarily representing all reactions are believed to represent some of the principal reactions which occur.

eral, it is preferred to use a chlorine substituted terminal alkylene oxide (terminal denoting that the epoxide group is on the end of the alkyl chain) and a particular preference is expressed for epichlorohydrin by reason of its cheapness, commercial availability, and excellence in forming epoxy resins useful for the purpose of this invention.

If desired, the halogen substituted aliphatic epoxide may also contain substituents such as, e.g., hydroxy keto, nitro, nitroso, ether, sulfide, carboalkoxy, etc.

Similarly, in lieu of the 2,2-bis-(p-hydroxyphenyl)-propane, one can use bis-(hydroxyaromatic)alkanes containing 16 or more carbon atoms, generally 16 to 30 carbon atoms such as, e.g., 2,2-bis-(1-hydroxy-4-naphthyl)-propane; 2,2-bis-(o-hydroxyphenyl)propane; 2,2-bis-(p-hydroxyphenyl)butane, 3,3-bis-(p-hydroxyphenyl)hexane; 2-(p-hydroxyphenyl)-4-(1-hydroxy-4-naphthyl)octane, 5-5-bis-(p-hydroxy-o-methylphenyl)-decane, bis-(p-hydroxyphenyl)methane, 2,2-bis-(p-hydroxy-o-isopropyl-phenyl)propane, 2,2-bis-(o,p-dihydroxyphenyl)propane, 2-(p-hydroxyphenyl)-5-(o-hydroxyphenyl)hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl)alkane since compounds of this type are readily available from the well-known condensation of phenols with aliphatic ketones or aldehydes in the pres-

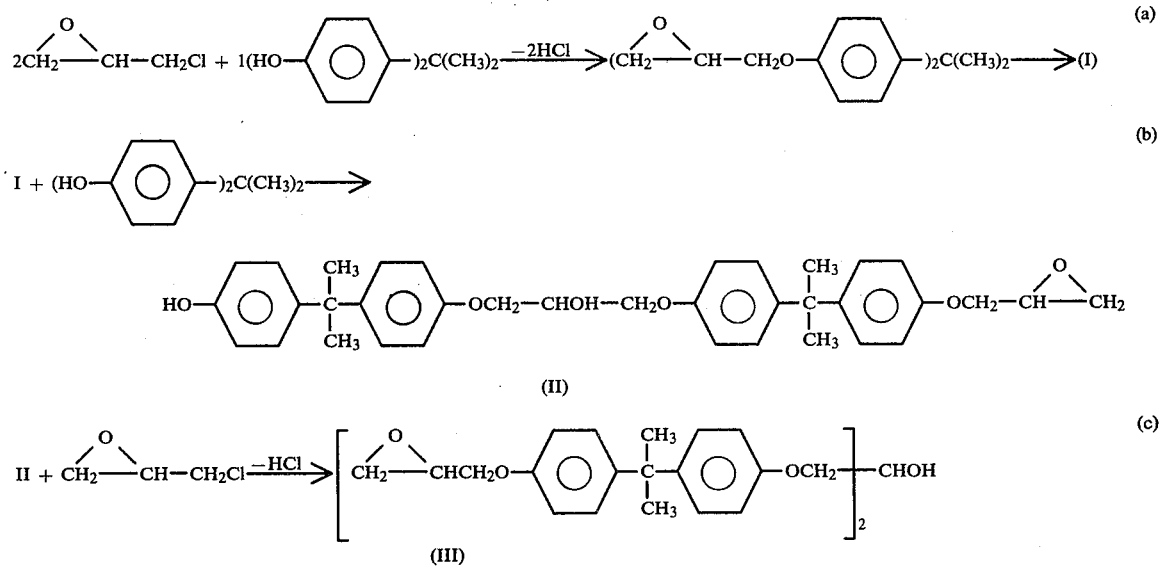

(d) III may likewise condense with additional epichlorohydrin and 2,2-bis-(p-hydroxyphenyl)propane to form higher polymers of the postulated general structure:

ence of a dehydrating agent such as sulfuric acid. A particular preferance is expressed for 2,2-bis-(p-hydroxyphenyl)propane, available commercially as "Bisphenol A," by reason of its low cost and commercial availabil-

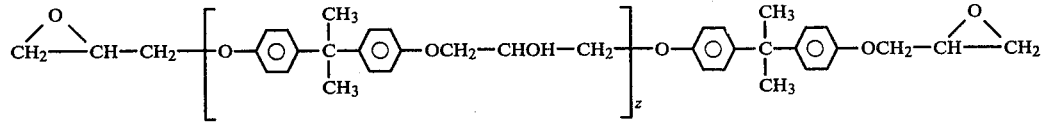

wherein z is an integer representing the number of repeat or mer units in the polymer chain.

In lieu of the epichlorohydrin, one can use halogen-substituted aliphatic epoxides containing 4 or more carbon atoms, generally 4 to 20 carbon atoms. In general, it is preferred to use a chlorine substituted terminal ity.

Epoxy resins which are especially suited for the purpose of the present invention are prepared by the reaction of bis-(hydroxyphenyl)alkane, preferably 2,2-bis-(p-hydroxyphenyl)propane with a chlorine substituted terminal alkylene oxide, preferably epichlorohydrin, to produce a product having an average molecular weight within the range of 300 to 500 and preferably 350 to 400. One of such preferred epoxy resins having an average molecular weight of about 380 and prepared from 2,2-bis-(p-hydroxyphenyl)propane and epichlorohydrin is known by the trade designation "Epon 820." A related type of epoxy resin having an average molecular weight of about 616 and prepared from epichlorohydrin and symmetrical tetrakis-(p-hydroxyphenyl)ethane is available under the trade designation "Epon 1031."

Another general class of epoxy resins which are useful for the purpose of the present invention are the aliphatic or cycloaliphatic epoxy resins. These resins, which are cyclic or acyclic olefins such as, e.g., methylcyclohexane, vinylcyclohexene, alpha-methyl-vinylcyclohexene, polybutadiene, etc., which contain at least one carbon-to-carbon multiple bond. One of such nonbenzenoid epoxy resins, known by the trade designation "Oxiron 2001," is made by oxidizing polybutadiene with peracetic acid. It is useful as the epoxy resin ingredient of a composition of the present invention. It is likewise useful when blended with a mixed aliphatic-aromatic epoxy resin of the type described earlier.

Still another class of epoxy resins which are useful for the purposes of the present invention are the novolak resins. Representative of the novolak resins are the phenol novolak and cresol novolak resins illustrated respectively by the following general structure:

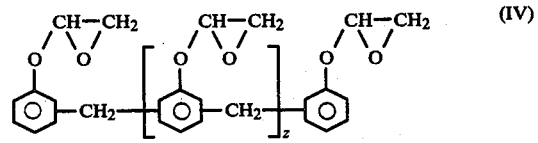

and

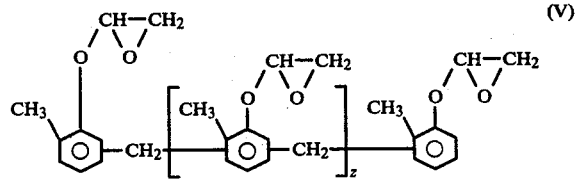

The curing agents, useful in the practice of the present invention, include those selected from the group consisting of (A) polyvalent metal salts of phosphorodithioic acids prepared by the reaction of a phosphorus sulfide with hydroxyl containing compounds of the general formula

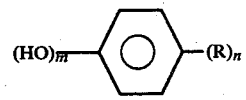

wherein R is hydrogen or a hydrocarbon based substituent containing from about 1 to about 100 carbon atoms, m is an integer ranging from 1 to about 3 and n is an integer ranging from about 1 to about 5 and the sum of m+n does not exceed 6 and the reaction product of (A) with (B) an amino compound corresponding to the general formula

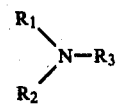

wherein each of $R_1$ and $R_2$ are independently hydrogen or a radical selected from the group consisting of hydrocarbon based radicals containing from 1 to about 20 carbon atoms and hydroxyl substituted hydrocarbon based radicals containing from 2 to about 20 carbon atoms, and $R_3$ is independently hydrogen or a radical selected from the group consisting of said radicals $R_1$ and $R_2$ and the radical

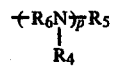

wherein each of $R_4$ and $R_5$ is independently hydrogen or a radical selected from the group consisting of said radicals $R_1$ and $R_2$, $R_6$ is a divalent hydrocarbon based radical containing from 1 to about 18 carbon atoms and p is an integer ranging from 1 to about 10.

As used herein, the term "hydrocarbon based radical" denotes a radical having a carbon atom directly attached to the remainder of the molecule and having predominantly hydrocarbon character within the context of this invention. Such radicals include the following:

(1) Hydrocarbon radicals; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, any two indicated substituents may together form an alicyclic radical).

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents, examples of which include halogen (e.g. chlorine, bromine, fluorine and iodine), nitro and hydroxyl groups.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur.

The polyvalent metal salts of phosphorodithioic acid, (A), forming a portion of the class of curing agents discussed above as useful in the present invention include those metal salts derived from the reaction of a phosphorus sulfide with a hydroxyl containing compound of the general formula

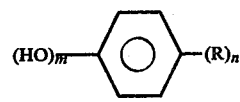

wherein R, m and n are as defined above. Preferably R is hydrogen or a hydrocarbon based substituent containing from 1 to about 70 carbon atoms and most preferred are those hydroxyl containing compounds where R is hydrogen or a hydrocarbon based substituent containing from 1 to about 12 carbon atoms.

In a preferred embodiment, the hydroxyl group containing compounds defined above are phenolic compounds of the general formula

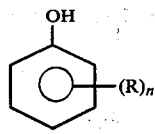

wherein R is hydrogen or a hydrocarbon based substituent selected from the group consisting of aliphatic, alicyclic and aromatic hydrocarbon based radicals containing from about 1 to about 70 carbon atoms and n is an integer ranging from 1 to 5 and preferably 1 to 2. Preferred hydrocarbon based substituents are those hydrocarbon based radicals selected from the group consisting of straight chain and branched chain aliphatic (i.e. alkyl and alkenyl) radicals containing from about 1 to about 12 carbon atoms and especially preferred are such aliphatic radicals containing 7 carbon atoms, i.e., heptyl and heptenyl radicals.

Representative examples of the hydroxyl containing compounds and specifically the phenolic compounds represented by the above general formula and useful in preparing the polyvalent metal salts of phosphorodithioic acid curing agents include phloroglucinol, pyrogallol, hydroquinone, resorcinol, catechol, hydroxyhydroquinone, 2-ethylphenol, 4-ethylphenol, 2,6-diethylphenol, 2-isopropylphenol, 2-sec-butylphenol, 4-tert-butylphenol, 2,4-di-tert-butylphenol, 2-tert-amylphenol, 2-(1,1,3,3-tetramethylbutyl)phenol, 2-(α,α-dimethylbenzylphenol)phenol, 2-cyclohexylphenol, heptylphenol, nonylphenol, dodecylphenol, 2-methyl-6-ethylphenol, 2-methyl-5-isopropylphenol (carvacrol), 2-methyl-4-tert-butylphenol, 4-methyl-2-ethylphenol, 2,4-dimethyl-6-tert-butylphenol, 2,5-dimethyl-4-tert-butylphenol, phenol, cresol, xylenol and the like.

The attachment of the hydrocarbon based group R to the benzene nuclei of the hydroxyl containing compounds employed in preparing the metal salts, (A), can be accomplished by a number of techniques well known to those skilled in the art. One particularly suitable technique is the Friedel-Crafts reaction, wherein an olefin (e.g., a polymer containing an olefinic bond), or halogenated or hydrohalogenated analog thereof, is reacted with a phenol. The reaction occurs in the presence of a Lewis acid catalyst (e.g., boron trifluoride and its complexes with ethers, phenols, hydrogen fluoride, etc., aluminum chloride, aluminum bromide, zinc dichloride, etc.). Methods and conditions for carrying out such reactions are well known to those skilled in the art. See, for example, the discussion in the article entitled, "Alkylation of Phenols" in "Kirk-Othmer Encyclopedia of Chemical Technology", Second Edition, Vol. 1, pages 894–895, Interscience Publishers, a division of John Wiley and Company, N.Y., 1963. Other equally appropriate and convenient techniques for attaching the hydrocarbon based group R to the benzene nuclei will occur readily to those skilled in the art.

Methods for preparing the polyvalent metal salts of phosphorodithioic acids, (A), which acids correspond to the formula

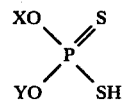

wherein X and Y are the same or different organic radicals derived from the hydroxyl containing compounds described herein above, are well known. For example, methods for preparing such metal salts are fully illustrated in U.S. Pat. Nos. 2,861,907 and 3,489,682 the teachings of which as they relate to the preparation of metal salts is incorporated herein by reference. In general, these methods involve first the preparation of the phosphorodithioic acid itself by the reaction of the hydroxyl containing compound or mixture of said hydroxyl containing compounds such as those defined hereinabove. The reaction involves mixing at a temperature ranging from about 20° C. to about 200° C., four moles of the hydroxyl containing compound or mixtures thereof with one mole of a phosphorus sulfide, preferably phosphorus pentasulfide, with hydrogen sulfide being liberated as the reaction proceeds. Once the phosphorodithioic acid is formed, then it is converted to its corresponding metal salt by treatment with a metal compound such as the oxide, hydroxide, hydride, carbonate, sulfide, methoxide, ethoxide or phenoxide of metals such as lithium, potassium, sodium, aluminum, barium, calcium, strontium, magnesium, zinc, iron, cobalt, nickel, copper, or cadmium. The most frequently used metal compounds are the oxides, carbonates and hydroxides of zinc, barium, calcium and cadmium with the oxides, carbonates and hydroxides of zinc being most preferred.

In converting the phosphorodithioic acid to the polyvalent metal salts useful in the present invention, it is often desirable to carry out said conversion in the presence of a catalyst (see U.S. Pat. No. 3,347,790). The catalyst is a carboxylic acid having up to about 10 aliphatic carbon atoms or a metal salt thereof. The acid may contain up to about 3 carboxylic radicals. Specific examples of these catalysts include formic acid, acetic acid, propionic acid, butyric acid, benzoic acid, trimelletic acid, o-phthalic acid, succinic acid, maleic anhydride, 1,3-cyclohexanedioic acid, decylbenzoic acid, toluic acid, valeric acid, caproic acid, sebacic acid, 2-heptanoic acid, itaconic acid, caprylic acid, 4-nonanoic acid, 3-decanoic acid, phenylacetic acid, naphthoic acid, 9-phenylstearic acid, dibutylbenzoic acid, and the salts thereof of a metal indicated above. Where a metal carboxylate is used as the catalyst, it is preferably the carboxylate of the same metal that is present in the metal salt of phosphorus acid produced by the process of this invention. Metal carboxylates useful as the catalyst are, for example, zinc acetate, calcium formate, barium butanoate, cobalt propionate, ferrous acetate, magnesium octanoate, cadmium naphthoate, cuprous acetate, nickel acetate, nickel phthalate, sodium acetate, potassium decanoate, lithium acetate, sodium benzoate, aluminum propionate, etc.

Only small amounts of such catalysts are required to promote a more complete reaction between the phosphorodithioic acid and the basic metal compound. Thus, the catalyst may be present in the reaction mixture at a concentration ranging from about 0.001 to about 0.2 equivalent per equivalent of the phosphorus acid in the reaction mixture. The preferred concentration of the catalyst is from about 0.01 to 0.1 equivalent per equivalent of the phosphorus acid.

As noted hereinabove, the polyvalent metal salts, (A), form only a portion of the class of curing agents useful in this invention. The remaining members of the class constitute the reaction product of the metal salts, (A), with an amine compound, (B). The amine compounds, (B), which can be reacted with the metal salts, (A), are those corresponding to the general formula

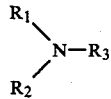

wherein each of $R_1$ and $R_2$ is independently hydrogen or a radical selected from the group consisting of hydrocarbon based radicals containing from about 1 to about 20 carbon atoms and hydroxyl substituted hydrocarbon based radicals containing from about 2 to about 20 carbon atoms, and $R_3$ is independently hydrogen or a radical selected from the group consisting of the radicals $R_1$ and $R_2$ and the radical

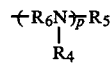

wherein each of $R_4$ and $R_5$ is independently hydrogen or a radical selected from the group consisting of the radicals $R_1$ and $R_2$, $R_6$ is a divalent hydrocarbon based radical containing from 1 to about 18 carbon atoms and p is an integer ranging from 1 to about 10. Preferably, amine compounds of the above formula, useful in the practice of this invention are those amines wherein $R_1$ and $R_2$ are independently hydrogen or a radical selected from the group consisting of hydrocarbon based radicals containing from 1 to about 10 carbon atoms and hydroxyl substituted hydrocarbon based radicals containing from 2 to about 10 carbon atoms and $R_3$ is hydrogen or a radical selected from the radicals $R_1$ and $R_2$ or the radical

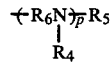

wherein each of $R_4$ and $R_5$ are independently hydrogen or radicals selected from the group consisting of the radicals $R_1$ and $R_2$, $R_6$ is an alkylene radical containing from 1 to 10 carbon atoms and p is an integer ranging from 2 to about 8.

As defined by the formula above, the amine compounds include both monoamines and polyamines. When each of $R_1$, $R_2$ and $R_3$ are hydrogen, the amine compound is ammonia; in other instances they are primary, secondary or tertiary monoamines or polyamines. These primary, secondary and tertiary amines include those mono- and polyamines wherein one or more of said $R_1$, $R_2$, $R_3$, $R_4$ and $R_5$ are hydrocarbon based or hydroxyl substituted hydrocarbon based radicals which can be aliphatic, alicyclic, aromatic or heterocyclic or any combination of these. The mono- and polyamines thus include aliphatic-substituted aromatic, aliphatic-substituted alicyclic, aliphatic-substituted heterocyclic, alicyclic-substituted aliphatic, alicyclic-substituted aromatic, alicyclic-substituted heterocyclic, aromatic-substituted aliphatic, aromatic-substituted alicyclic, aromatic-substituted heterocyclic, heterocyclic-substituted aliphatic, heterocyclic-substituted alicyclic, and heterocyclic-substituted aromatic amines which may be saturated or unsaturated. If unsaturated, the amine will be free from acetylenic unsaturation (i.e., —C≡C—).

Aliphatic monoamines include mono-, di- and trialiphatic substituted amines wherein the aliphatic groups can be saturated or unsaturated and straight or branched chain. Thus, they are primary, secondary or tertiary aliphatic amines. Such amines include, for example, mono-, di- and tri-alkyl-substituted amines, mono-, di- and tri-alkenyl-substituted amines, and amines having one or two N-alkenyl substituents, one or two N-alkyl substituents and the like. The total number of carbon atoms in these aliphatic monoamines will normally not exceed about 40 and usually not exceed about 20 carbon atoms. Specific examples of such monoamines include ethylmethylamine, diethylamine, n-butylamine, di-n-butylamine, tri-n-butylamine, allylamine, isobutylamine, cocoamine, stearylamine, laurylamine, methyllaurylamine, oleylamine, N-methyl N-octylamine, dodecylamine, octadecylamine, and the like. Examples of alicyclic-substituted aliphatic amines, aromatic-substituted aliphatic amines, and heterocyclic-substituted aliphatic amines, include 2-(cyclohexyl)-ethylamine, benzylamine, phenylethylamine, 3-(furylpropyl)amine and the like.

Alicyclic monoamines are those monoamines wherein there is an alicyclic substituent attached directly to the amino nitrogen through a carbon atom in the cyclic ring structure. Examples of alicyclic monoamines include cyclohexylamine, cyclopentylamine, cyclohexenylamine, cyclopentenylamines, N-ethylcyclohexylamine, dicyclohexylamine, and the like. Examples of aliphatic-substituted, aromatic-substituted, and heterocyclic-substituted alicyclic monoamines include propyl-substituted cyclohexylamines, phenyl-substituted cyclopentylamines, and pyranyl-substituted cyclohexylamine.

Suitable aromatic amines include those monoamines wherein a carbon atom on the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(-para-methylphenyl) amine, naphthyl amine, N-(n-butyl) aniline, and the like. Examples of aliphatic-substituted, alicyclic-substituted, and heterocyclic-substituted aromatic monoamines are para-ethyl aniline, para-dodecyl aniline, cyclohexyl-substituted naphthyl amine, and thienyl-substituted aniline.

Heterocyclic monoamines can also be used in making the curing agents prepared by the reaction of the polyvalent metal salt with amine. As used herein, the terminology "heterocyclic monoamine(s)" is intended to describe those heterocyclic amines containing at least one primary or secondary amino group and at least one nitrogen as a heteroatom in a heterocyclic ring. Heterocyclic amines can be saturated or unsaturated and can be substituted with alkyl, alkenyl, aryl, alkaryl or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The five- and six-membered heterocyclic rings are preferred.

Among the suitable heterocyclics are aziridines, azetidines, azolidines, pyrrolidine, pyridine, di-, and tetra-hydropyridines, pyrroles, indoles, quinoline, picolines, piperidine and the like. Mixtures of two or more of these heterocyclic amines can be used. Typical heterocyclic amines are the saturated 5- and 6-membered heterocyclic amines.

Polyamines useful in preparing certain of the curing agents employed in the present invention are those defined by the above general formula wherein $R_3$ is the radical

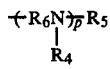

wherein each of $R_4$ and $R_5$ are independently hydrogen or radicals selected from the group consisting of the radicals $R_1$ and $R_2$, i.e., hydrocarbon based radicals containing from 1 to about 20 and preferably 1 to about 10 carbon atoms and hydroxyl substituted hydrocarbon based radicals containing from 2 to about 20 and preferably 2 to about 10 carbon atoms, $R_6$ is a divalent hydrocarbon based radical containing from 1 to about 18 carbon atoms and p is an integer ranging from about 1 to about 10. Preferably $R_6$ is an alkylene radical containing from 1 to about 10 carbon atoms and most preferably lower alkylene radicals containing from 2 to about 6 carbon atoms. As used herein the term "lower alkylene" radicals refers to alkylene radicals containing from 1 to about 7 carbon atoms. Especially useful polyamines are those wherein each of $R_4$ and $R_5$ are independently hydrogen or aliphatic or hydroxy-substituted aliphatic radicals. Such alkylene polyamines include methylene polyamines, ethylene polyamines, butylene polyamines, propylene polyamines, pentylene polyamines, hexylene polyamines and heptylene polyamines. The higher homologs of such amines and related aminoalkyl-substituted piperazines are also included. Specific examples of such polyamines include ethylene diamine, triethylamine tetramine, tris(2-aminoethyl)amine, propylene diamine, trimethylene diamine, hexamethylene diamine, decamethylene diamine, octamethylene diamine, di(-heptamethylene) triamine, tripropylene tetramine, tetraethylene pentamine, trimethylene diamine, pentaethylene hexamine, di(trimethylene) triamine, 2-heptyl-3-(2-aminopropyl)imidazoline, 1,3-bis(2-aminoethyl)imidazoline, 1-(2-aminopropyl)piperazine, 1,4-bis(2-aminoethyl)piperazine and 2-methyl-1-(2-aminobutyl)-piperazine. Higher homologs, obtained by condensing two or more of the above-illustrated alkylene amines, are also useful. Such polyamines are described in detail under the heading "Diamines and Higher Amines, Aliphatic" in Kirk-Othmer, *Encyclopedia of Chemical Technology*, Third Edition, Vol. 7, pp. 580–602.

Especially useful amines employed in preparing certain of the curing agents, i.e., these curing agents derived from the polyvalent metal salts of phosphorodithioic acid of (A) and (B) the amine compounds described herein, of the invention are those wherein one or more of the radicals $R_1$, $R_2$, $R_3$, $R_4$ and $R_5$ are hydroxyl substituted hydrocarbon based substituents and particularly hydroxyl substituted alkyl radicals containing up to 10 carbon atoms. Of the hydroxyl substituted monoamines and polyamines, the monoamines of hydroxyl substituted straight chain and branched chain aliphatic hydrocarbon based radicals and particularly alkyl hydrocarbon based radicals are most preferred. Representative examples of the above disclosed hydroxyl mono- and polyamines which can be employed herein include ethanolamine, di-3-propanolamine, 4-hydroxybutylamine, diethanolamine, triethanolamine, N-methyl-2-propanolamine, 3-hydroxyaniline, N-(2-hydroxyethyl)ethylene diamine, N,N'-bis(2-hydroxyethyl)ethylene, 1-(2-hydroxyethyl) piperazine, monohydroxypropyl-substituted diethylene triamine, dihydroxypropyl-tetraethylene pentamine, N-(3-hydroxybutyl)tetramethylene diamine, N,N,N',N'-tetrakis(2-hydroxypropyl)ethylene diamine and the like.

Of the amine compounds that can be reacted with the polyvalent metal salts defined above, the monoamines and particularly the tertiary monoamines containing at least one and particularly three hydroxyl substituted aliphatic radicals having from 2 to about 10 are preferred. Especially preferred monoamines are tertiary amines having three hdroxyl substituted alkyl radicals containing from 2 to about 6 carbon atoms, triethanolamine being an example of these preferred monoamines.

The reaction product of the polyvalent metal salts, (A), with the above defined amines, (B), are readily prepared by merely mixing the desired metal salt and amine in a suitable reaction vessel. Since the polyvalent metal salt is usually a solid material at room temperature, it must first be liquified by either heating to its melting point or by use of a suitable solvent prior to the addition thereto of the amine reactant. Suitable solvents for the polyvalent metal include ketones such as acetone, methyl ethyl ketone, methyl isobutyl ketone and the like; glycol ethers such as methoxyethanol, ethoxyethanol, 2-(2-methoxyethoxy)ethanol and the like; and preferably aromatic hydrocarbons such as benzene, toluene, xylene etc. The reaction product of the polyvalent metal salts, (A), with the amines, (B) can also be formed in situ in an epoxy resin such as those described hereinabove. When forming the reaction product in situ, it is necessary that the polyvalent metal salt be added to the resin first followed by the addition of the amine reactant. The reason for this order of addition is based on the fact that many of the amine compounds (B) employed to prepare the polyvalent metal salt/amine reaction products are themselves curing agents for epoxy resins. However, when the polyvalent metal salt is added first, there occurs no rapid increase in resin viscosity which would be indicative of curing taking place.

The molar ratio of amine, based on nitrogen, to the polyvalent metal salt, based on the metal, employed to prepare the amine/polyvalent metal salt curing agent can vary from about 1:1 to about 10:1 with a preferred ratio of about 2:1 to about 4:1. A specific molar ratio which is found to provide especially good results is that of about 3.2:1.

The curing agents useful in the practice of this invention provide curable epoxy resins exhibiting improved potlife. Generally, the resin/curing agent compositions of the present invention exhibit useful potlife (i.e., fluidity) ranging from about 1 to about 14 days at about 50° C. and several months at room temperature. In particular, the polyvalent metal salt curing agents will generally provide curable epoxy resin compositions having a potlife ranging from a few hours to about 2 days at 50° C. whereas the polyvalent metal salt/amine reaction product curing agents will provide a curable epoxy resin composition having a potlife up to about 14 days at 50° C. The improved potlife of the curable epoxy resin compositions containing the polyvalent metal salt/amine curing agents is particularly unexpected when one considers that the amines and particularly the hydroxyl containing amines employed in preparing such curing agents are themselves excellent room temperature curing agents for epoxy resins.

The amount of curing agent employed in the curable compositions of this invention will range from about 10 to about 100 percent by weight based on the weight of the epoxy resin component of said curable compositions. Preferably the amount of the curing agent will range from about 10 to about 35 percent by weight based on the weight of the epoxy resin component.

The epoxy resin compositions of the present invention, i.e., epoxy resin plus curing agent, are usful in a wide variety of applications including protective coatings, structural plastics, adhesives, potting compounds, etc. When employed in coating applications, the epoxy resin/curing agent compositions are diluted with a suitable diluent to provide good flow properties to the compositions when applied to a substrate and prior to their undergoing cure. The degree of dilution of said compositions with said solvents will generally be dependent on the method of application, e.g., brush, roller or spray applications, employed to apply the compositions to the substrate being coated and generally will comprise solutions containing from 30 to 75 percent by weight, based on the total weight of the solution, of the epoxy resin/curing agent composition.

Suitable diluents for use with the curable compositions of this invention include aromatic hydrocarbons and oxygenated compounds such as ketones and glycol ethers. Representative examples of these diluents include for the aromatic hydrogens such materials as benzene, toluene, xylene and the like; the ketones include acetone, methyl ethyl ketone, methyl isobutyl ketone, ethyl amyl ketone, cyclohexanone and the like; and the glycol ethers include 2-methoxyethanol, 2-ethoxyethanol, 2-n-butoxyethanol, 2-(2-methoxyethoxy)ethanol, 2-(2-ethoxyethoxy)ethanol, 2-(2-(n-butoxyethoxy))ethanol and the like. Mixtures of diluents within a given class of diluents or between various members of these classes can be used as well as a single diluent selected from any of the above-defined classes of diluents.

The curable compositions of the present invention are cured through the application of heat. Curing of these compositions can take place over a wide range of temperatures. Generally, such temperatures will range from about 50° C. to about 300° C., however, a more preferable temperature range will be from about 100° C. to about 250° C.

The practice of the invention is illustrated in the examples set forth below. In these examples, all parts and percentages are by weight unless otherwise indicated.

EXAMPLE 1

To a reactor equipped with a stirrer, condenser and thermometer is charged 2,802 parts (14.59 moles) heptylphenol. The phenol is heated to 140° C., followed by the incremental addition of 698 parts (3.14 moles) phosphorus pentasulfide ($P_2S_5$) over 2.25 hours at 138°–149° C. The reaction is continued with stirring for 3.6 hours while nitrogen purging at 149°–154° C. The materials are then cooled to 99° C. and purged with nitrogen for an additional 6 hours. The product obtained has a neutralization number (Bromophenol Blue) of 93.8.

EXAMPLE 2

To a reactor equipped as described in Example 1 is charged 432 parts (4 moles) p-cresol, 432 parts (4 moles) m-cresol, and 444 parts (2 moles) $P_2S_5$. The materials are heated to 110° C. and held there, with a nitrogen purging, for 2.5 hours. The reaction mixture is then filtered with a diatomaceous earth filter aid. Filtrate, 1,145 parts, having a neutralization number (Bromophenol Blue) of 174, is obtained.

EXAMPLE 3

To a reactor equipped as described in Example 1 is charged 922 parts (4.8 moles) heptylphenol and 182 parts (0.8 mole) of 2,2-bis(4-hydroxyphenyl)propane (Bisphenol A, obtained from Dow Chemical Company). The Bisphenol A is dissolved in the heptylphenol while heating the materials to 140° C. over a period of 1.2 hours. Phosphorus pentasulfide, 355 parts (1.6 moles), is added in increments every five minutes over 3 hours, maintaining the temperature at 120°–140° C. The reaction is continued with stirring at 135°–140° C. for 3 additional hours. The unfiltered materials are the product.

EXAMPLE 4

To a reactor equipped with a condenser, stirrer, thermometer, and addition funnel, are charged 1,480 parts of toluene, 66 parts of (0.81 moles) zinc oxide and 6 parts of tap water. The materials are thoroughly mixed for 3 minutes at room temperature. Acetic acid, 6 parts, is then added and mixed for an additional 9 minutes at room temperature. Two thousand three hundred thirteen parts (2,313) (3.87 moles) of the product from Example 1 is then added to the above mixture over a period of 1.4 hours. Zinc oxide, 130 parts (1.60 moles), is added simultaneously during the first 0.9 hour of this addition. During the addition of the product from Example 1 and the zinc oxide the temperature increases exothermically from room temperature to 50° C. The reaction mixture is then heated to 77° C. and held at 77°–82° C. for 2.2 hours. The water in the reaction mixture is removed, azeotropically, followed by the addition of 154 parts of additional toluene. The toluene solution is filtered through a diatomaceous earth filter aid.

EXAMPLE 5

Five hundred parts of the product of Example 4 is stripped to 121° C. at 10 mm mercury to remove all solvent. The solvent-free product is a liquid at 80° C. and a resinous solid at room temperature.

EXAMPLE 6

A reactor equipped as described in Example 4 is charged with 174.8 parts (2.13 moles) zinc oxide and 3.55 parts (0.06 mole) of acetic acid. A suspension of 250 parts of the reaction product of Example 2 and 250 parts of heptane are mixed and added to the reaction flask. A vacuum (18 mm mercury) is applied to the reaction flask and the reaction mixture is heated to 50° C. After heating is stopped, the temperature continues to rise exothermically to 65° C. An additional 895 parts (for a total of 3.55 moles) of the reaction product of Example 2 is added over one hour while the exothermic reaction is kept at 50°–65° C. While the vacuum is maintained at about 18 mm mercury, the reaction is continued at 60°–65° C. for two hours, then is stirred for an additional three hours at 80° C. The reaction mixture is heated to 100° C. and filtered through a diatomaceous earth filter aid. The filtrate contains 9.11% zinc.

EXAMPLE 7

To the reaction product of Example 3, contained in a reactor equipped as in Example 4, is added 8 parts tap water, and the materials are heated to 67° C. One hundred forty-three parts (1.76 moles) zinc oxide is added over 1.7 hours at 60°–67° C. The reaction is continued for five hours at 60°–67° C. The reaction mixture is cooled to room temperature and 300 grams toluene is added, followed by stirring and nitrogen purging for 0.7 hour. The toluene solution is filtered through a diatomaceous earth filter aid. The filtrate is a toluene solution of the desired product.

EXAMPLE 8

Following the procedure of Example 4, 4,788 parts of a zinc salt containing 34% by weight toluene is prepared.

EXAMPLE 9

To a reactor equipped with a stirrer, thermometer, condenser and dropping funnel is charged 3,352 parts of a product prepared by the procedure of Example 5. Starting at 88° C., 1,550 parts xylene is added over 0.6 hour. Gentle heating is employed to maintain a temperature of 79°–88° C. To this xylene solution is added 1,284 parts triethanolamine over 0.8 hour at 79°–88° C. The reaction is not heated during amine addition. Mixing is continued for one hour after amine addition is complete. A liquid product at room temperature is obtained.

EXAMPLE 10

To a reactor equipped as in Example 9 is charged 1,726 parts of a product prepared as described in Example 5. Starting at 103° C., 613 parts triethanolamine is added dropwise over one hour. The reaction mixture is not heated during the addition and the temperature drops to 89° C. The reaction mixture is heated to 99° C. over 0.3 hour. The product is solid at room temperature.

EXAMPLE 11

Following the procedure of Example 9, 2,057 parts of a product as described in Example 5 is mixed with 703 parts xylene. In a reactor as described in Example 1, 315 parts triethanolamine is added to 1,000 parts of the above xylene solution over 0.7 hour. The temperature rose exothermically from room temperature to 38° C. Ninety-eight parts of additional xylene is added and the materials are stirred for one hour.

EXAMPLE 12

A reactor equipped as described in Example 1, is charged with 375 parts of a product as described in Example 5. The material is heated to 90° C. One hundred twenty-five parts of xylene is added followed by stirring until a uniform mixture is obtained. The solution is heated to 50° C. Anhydrous NH$_3$ was blown into this solution in four 0.1–0.2 hour increments at 2 cubic feet per hour, each followed by a nitrogen purge. Twenty-five parts of the anhydrous NH$_3$ are consumed during the reaction.

EXAMPLES 13–42

A solution is prepared using 212 parts of the product of Example 8, 133 parts of the glycol ether, 2-ethoxyethanol, available from Dow Chemical Company under the trademark Dowanol EE, 60 parts of methyl isobutyl ketone and 120 parts xylene. Then 52.46 parts (0.0144 mole of zinc) of this solution are reacted, at room temperature, with the nitrogen compounds and in the amounts indicated in TABLE I below.

TABLE I

| Example | Amine | Equiv. Wt | Parts by Wt |
|---|---|---|---|
| 13 | Diethylenetriamine | 34.4 | 0.99 |
| 14 | Ethylene diamine | 30.0 | 0.86 |
| 15 | Diethylethanolamine | 117.0 | 3.37 |
| 16 | Diethanolamine | 105.0 | 3.02 |
| 17 | Ethanolamine | 61.0 | 1.76 |
| 18 | Aminopropylmorpholine | 144.0 | 4.15 |
| 19 | Triethylamine | 101.0 | 2.91 |
| 20 | " | 101.0 | 3.5 |
| 21 | " | 101.0 | 4.5 |
| 22 | Triethanolamine | 149.19 | 4.30 |
| 23 | Ethylene diamine | 30.0 | 0.43 |
| 24 | " | 30.0 | 1.30 |
| 25 | Triethanolamine | 149.19 | 4.30 |
| 26 | " | 149.19 | 6.44 |
| 27 | " | 149.19 | 10.76 |
| 28 | " | 149.19 | 12.88 |
| 29 | Ethylene diamine | 30.0 | 1.94 |
| 30 | " | 30.0 | 3.23 |
| 31 | " | 30.0 | 4.52 |
| 32 | Morpholine | 87.0 | 9.12 |
| 33 | " | 87.0 | 27.36 |
| 34 | Dimethylethanolamine | 89.0 | 20.0 |
| 35 | " | 89.0 | 40.0 |
| 36 | Morpholine | 87.0 | 27.36 |
| 37 | " | 87.0 | 15.0 |
| 38 | " | 87.0 | 20.0 |
| 39 | Quadrol[a] | 146.0 | 4.2 |
| 40 | " | 146.0 | 8.4 |
| 41 | " | 146.0 | 10.47 |
| 42 | " | 146.0 | 12.57 |

[a]Quadrol is N,N,N',N'—tetrakis(2-hydroxypropyl)ethylene diamine available from BASF Wyandotte.

EXAMPLES 43–49

A series of curable epoxy resin compositions representative of those described herein is prepared by mixing in a suitable container, at room temperature and with constant stirring, polyvalent metal salts of Examples 4–6 with DER 331, an epoxy resin available commercially from the Dow Chemical Company and having an epoxide equivalent weight ranging from 182–190 and a viscosity measured at 25° C. ranging from 4,500–10,000 centipoise. All data pertaining to the curable epoxy resins of Examples 43–49 is set forth in TABLE II below.

TABLE II

| Example No. | Curing Agents From | Weight Ratio Resin/Curing Agent |
|---|---|---|
| 43[a] | Example 4 | 62:38 |
| 44 | Example 5 | 50:50 |
| 45 | " | 68:32 |
| 46 | " | 70:30 |
| 47 | Example 6 | 80:20 |
| 48 | " | 85:15 |
| 49[b] | Example 4 | 69:31 |

[a]Diluted with toluene to give a composition having a solids content of 50 percent by weight.
[b]Diluted with a mixed aromatic hydrocarbon/methyl ethyl ketone/butyl cellosolve solvent to give a composition having a solids content of 50 percent by weight.

EXAMPLES 50-79

A series of curable epoxy resin compositions is prepared in the same manner as described in Examples 43-49 above except that in these examples the curing agents from Examples 13-42 are employed in combination with DER 671-X75. The weight ratio of epoxy resin to curing agents, in all instances, was 70 parts by weight resin to 30 parts by weight curing agent. Members of this series of compositions exhibit extended pot-life ranging up to 14 days at 50° C.

EXAMPLE 80

A curable epoxy resin composition is prepared in accordance with the procedure as described in Examples 43-49 above except that 30 parts by weight of the curing agent from Example 10 was mixed with 70 parts by weight of Dow's DER 331.

EXAMPLE 81

To a reactor equipped with a stirrer, condenser, and thermometer is added 75 parts of the product from Example 5 and 25 parts of xylene. The resulting solution is stirred for 30 minutes at a temperature of from 92°-102° C. At the end of this time 30.6 parts of the above solution is added to 57 parts of DER 671-X75 and 59.7 parts of a mixed solvent consisting of glycol ether/methylisobutyl ketone/xylene. To this mixture is then added 7.4 parts of triethanolamine with continuous mixing to form a reaction product of the zinc salt of Example 5 with the triethanolamine, in situ, in the epoxy resin.

The curable epoxy resin compositions of Examples 43-81 are cured by heating the composition at temperatures in the range of 138° C. to 177° C. after applying to a metal substrate.

EXAMPLE 82

A curable composition is prepared by mixing 177.1 parts of DER 671-X75 epoxy resin solution with 67.1 parts of a curing agent prepared in xylene by reacting a zinc salt, similar to that described in Example 5, with triethanolamine. The molar ratio of triethanolamine to zinc salt in this composition is 3.2 to 1. The curable composition is further diluted with a mixture of xylene, methylisobutyl ketone and Dowanol EE to give a solution containing 50% by weight epoxy resin plus curing agent.

The above solution is stored at 50° C. over a period of days and the viscosity, in centipoise (cps), is determined with a Brookfield Viscometer Model RVF with spindles 1-4 at 10 rpm.

| Day | Viscosity (cps) | Temperature °C. |
|---|---|---|
| 0 | 44 | 25 |
| 4 | 87 | 50 |
| 5 | 120 | 50 |
| 6 | 160 | 50 |
| 7 | 228 | 50 |
| 10 | 1400 | 50 |
| 11 | 4330 | 50 |
| 12 | 19640 | 50 |
| 13 | Gel | 50 |

On the 10th and 11th days, the above composition is applied to a number of metal panels and are cured at 150° C. for 15 minutes. The cured film thicknesses are about 2 mils, the pencil hardnesses is between 2 and 3 H and the films resist 100 methyl ethyl ketone rubs indicating complete cure. These properties are equivalent to values obtained with similar solutions applied and cured without elevated temperature storage.

What is claimed is:

1. A curable epoxy resin composition comprising a mixture of an epoxy resin and a polyvalent metal salt of a phosphorodithioic acid prepared by the reaction of a phosphorus sulfide with a hydroxyl containing compound of the general formula

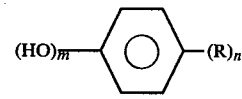

wherein R is hydrogen or a hydrocarbon-based substituent containing from about 1 to about 100 carbon atoms; m is an integer ranging from 1 to about 3 and n is an integer ranging from 1 to about 5 with the proviso that the sum of m+n does not exceed 6.

2. A composition in accordance with claim 1 wherein the epoxy resin is selected from the group consisting of aliphatic-aromatic, aliphatic and cycloaliphatic epoxy resins and wherein the polyvalent metal salt of a phosphorodithioic acid is prepared by the reaction of a phosphorus sulfide with a phenolic compound of the general formula

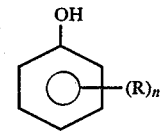

wherein R is hydrogen or a hydrocarbon-based substituent selected from the group consisting of aliphatic, alicyclic and aromatic hydrocarbon-based radicals containing from about 1 to about 70 carbon atoms; and n is an integer ranging from 1 to 5.

3. A composition in accordance with claim 2 further characterized in that the epoxy resin is an aliphatic-aromatic epoxy resin prepared by the reaction of a bis(-hydroxyaromatic)alkane with a halogen-substituted aliphatic epoxide.

4. A composition in accordance with claim 2 wherein the polyvalent metal salt is a zinc salt.

5. A composition in accordance with claim 2 wherein R of the phenolic compound is hydrogen or a radical selected from the group consisting of straight chain or branched chain aliphatic hydrocarbon-based radical containing from about 1 to about 12 carbon atoms.

6. A composition in accordance with claim 5 wherein the radical R is selected from the group consisting of straight chain and branched chain aliphatic radicals containing 7 carbon atoms.

7. A curable epoxy resin composition comprising an epoxy resin, and a reaction product of (A) a polyvalent metal salt of a phosphorodithioic acid prepared by the reaction of a phosphorus sulfide with a hydroxyl containing compound corresponding to the general formula

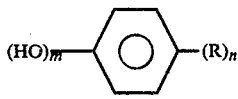

wherein R is a hydrogen or a hydrocarbon based radical containing from about 1 to about 100 carbon atoms; m is an integer ranging from 1 to about 3 and n is an integer ranging from 1 to about 5 with the proviso that the sum of m+ n is an integer not to exceed 6 with (B) an amine compound corresponding to the general formula

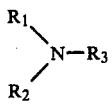

wherein each of $R_1$ and $R_2$ is independently hydrogen or a radical selected from the group consisting of hydrocarbon based radicals containing from 1 to about 20 carbon atoms and hydroxyl substituted hydrocarbon based radicals containing from 2 to about 20 carbon atoms, $R_3$ is independently hydrogen or a radical selected from the group consisting of said radicals $R_1$ and $R_2$ and the radical

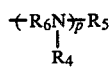

wherein each of $R_4$ and $R_5$ is independently hydrogen or a radical selected from the group consisting of said radicals $R_1$ and $R_2$, $R_6$ is a divalent hydrocarbon-based radical containing from 1 to about 18 carbon atoms and p is an integer ranging from 1 to about 10.

8. A composition in accordance with claim 7 wherein the epoxy resin is selected from the group consisting of aliphatic-aromatic, aliphatic and cycloaliphatic epoxy resins.

9. A composition in accordance with claim 7 wherein the polyvalent metal salt of the phosphorodithioic acid of (A) is prepared by the reaction of a phosphorus sulfide with a phenolic compound corresponding to the general formula

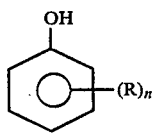

wherein R is hydrogen or a hydrocarbon based radical selected from the group consisting of aliphatic, alicyclic and aromatic hydrocarbon based radicals containing from about 1 to about 70 carbon atoms and n is an integer ranging from 1 to 5.

10. A composition in accordance with claim 7 wherein the amine compound of (B) corresponds to the general formula

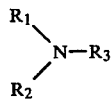

wherein each of $R_1$ and $R_2$ is independently hydrogen or a radical selected from the group consisting of aliphatic, alicyclic and aromatic hydrocarbon based radicals containing from 1 to about 10 carbon atoms and hydroxyl substituted aliphatic, alicyclic and aromatic hydrocarbon based radicals containing from about 2 to about 10 carbon atoms, $R_3$ is independently hydrogen or a radical selected from the group consisting of said radicals $R_1$ and $R_2$ and the radical

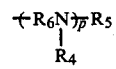

wherein each of $R_4$ and $R_5$ is independently hydrogen or a radical selected from the group consisting of said radicals $R_1$ and $R_2$, $R_6$ is an alkylene radical containing from 1 to about 10 carbon atoms and p is an integer ranging from 2 to about 8.

11. A curable epoxy resin composition comprising an epoxy resin selected from the group consisting of aliphatic-aromatic, aliphatic and cycloaliphatic epoxy resins, and a reaction product of (A) a polyvalent metal salt of a phosphorodithioic acid prepared by the reaction of a phosphorus sulfide with a phenolic compound corresponding to the general formula

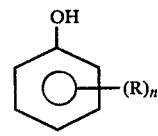

wherein R is hydrogen or a hydrocarbon based radical selected from the group consisting of aliphatic, alicyclic and aromatic hydrocarbon based radicals containing from about 1 to about 70 carbon atoms and where n is an integer ranging from 1 to 5 with (B) an amine compound corresponding to the general formula

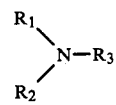

wherein each of $R_1$ and $R_2$ is independently hydrogen or a radical selected from the group consisting of aliphatic, alicyclic and aromatic hydrocarbon based radicals containing from 1 to about 10 carbon atoms and hydroxyl substituted aliphatic, alicyclic and aromatic hydrocarbon based radicals containing from 2 to about 10 carbon atoms, $R_3$ is independently hydrogen or a radical selected from the group consisting of said radicals $R_1$ and $R_2$ and the radical

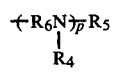

wherein each of $R_4$ and $R_5$ is independently hydrogen or a radical selected from the group consisting of said radicals $R_1$ and $R_2$, $R_6$ is an alkylene radical containing from 1 to about 10 carbon atoms and p is an integer ranging from about 2 to about 8.

12. A composition in accordance with claim 11 where the epoxy resin is prepared by the reaction of bis(hydroxyaromatic)alkane with a halogen-substituted aliphatic epoxide.

13. A composition in accordance with claim 11 wherein the polyvalent metal salt, (A), is prepared by the reaction of a phosphorus sulfide with a phenolic compound corresponding to the general formula

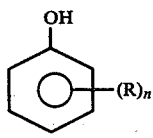

wherein R is hydrogen or a straight chain or branched chain aliphatic hydrocarbon based radical containing from 1 to about 12 carbon atoms and n is an integer ranging from 1 to 5.

14. A composition in accordance with claim 13 wherein the radical R is selected from the group consisting of straight chain and branched chain aliphatic radicals containing 7 carbon atoms.

15. A composition in accordance with claim 13 wherein the polyvalent metal salt, (A), is a zinc salt.

16. A composition in accordance with claim 11 wherein the amine compound, (B), corresponds to the general formula

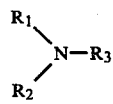

wherein $R_1$, $R_2$ and $R_3$ are the same or different radicals selected from the group consisting of straight chain and branched chain aliphatic hydrocarbon based radicals containing from 1 to about 10 carbon atoms and hydroxyl substituted straight chain and branched chain aliphatic hydrocarbon radicals containing from 2 to about 10 carbon atoms provided that at least one of said $R_1$, $R_2$ and $R_3$ be one of said hydroxyl substituted radicals.

17. A composition in accordance with claim 16 wherein each of $R_1$, $R_2$ and $R_3$ of the amine compound, (B), are said hydroxyl substituted radicals.

18. A composition in accordance with claim 17 wherein each of said hydroxyl substituted radicals, $R_1$, $R_2$ and $R_3$ contain from 2 to about 6 carbon atoms.

19. A composition comprising the reaction product of (A) a polyvalent metal salt of a phosphorodithioic acid prepared by the reaction of a phosphorus sulfide with a hydroxyl containing compound corresponding to the general formula

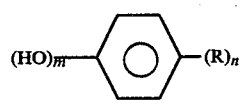

wherein R is hydrogen or a hydrocarbon based radical containing from about 1 to about 100 carbon atoms; m is an integer ranging from 1 to about 3 and n is an integer ranging from 1 to about 5 with the proviso that the sum of m+n does not exceed 6 with (B) an amine compound corresponding to the general formula

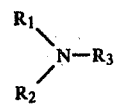

wherein each of $R_1$ and $R_2$ is independently hydrogen or a radical selected from the group consisting of hydrocarbon based radicals containing from 1 to about 20 carbon atoms and hydroxyl substituted hydrocarbon based radicals containing from 2 to about 20 carbon atoms, $R_3$ is independently hydrogen or a radical selected from the group consisting of said radicals $R_1$ and $R_2$ and the radical

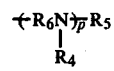

wherein each of $R_4$ and $R_5$ is independently hydrogen or a radical selected from the group consisting of said radicals $R_1$ and $R_2$, $R_6$ is a divalent hydrocarbon based radical containing from 1 to about 18 carbon atoms and p is an integer ranging from 1 to about 10, for use in curing epoxy resins.

20. A composition in accordance with claim 19 wherein the polyvalent metal salt of the phosphorodithioic acid, (A), is prepared by the reaction of a phosphorus sulfide with a phenolic compound corresponding to the general formula

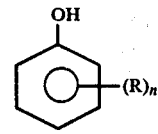

wherein R is hydrogen or a hydrocarbon based radical selected from the group consisting of aliphatic, alicyclic and aromatic hydrocarbon based radicals containing from about 1 to about 70 carbon atoms and n is an integer ranging from 1 to 5.

21. A composition in accordance with claim 19 wherein the amine compound, (B), corresponds to the general formula

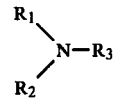

wherein each of $R_1$ and $R_2$ is independently hydrogen or a radical selected from the group consisting of aliphatic, alicyclic and aromatic hydrocarbon based radicals containing from 1 to about 10 carbon atoms and hydroxyl substituted aliphatic, alicyclic and aromatic hydrocarbon based radicals containing from about 2 to about 10 carbon atoms, $R_3$ is independently hydrogen or a radical selected from the group consisting of said radicals $R_1$ and $R_2$ and the radical

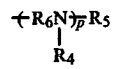

wherein each of $R_4$ and $R_5$ is independently hydrogen or a radical selected from the group consisting of said radicals $R_1$ and $R_2$, $R_6$ is an alkylene radical containing from 1 to about 10 carbon atoms and p is an integer ranging from about 2 to about 8.

22. A composition comprising the reaction product of (A) a polyvalent metal salt of a phosphorodithioic acid prepared by the reaction of a phosphorus sulfide with a phenolic compound corresponding to the general formula

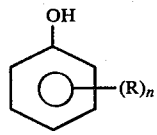

wherein R is hydrogen or a hydrocarbon based radical selected from the group consisting of aliphatic, alicyclic and aromatic hydrocarbon based radicals containing from about 1 to about 70 carbon atoms and where n is an integer ranging from 1 to 5 and with (B) an amine compound corresponding to the general formula

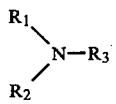

wherein each of $R_1$ and $R_2$ is independently hydrogen or a radical selected from the group consisting of aliphatic, alicyclic and aromatic hydrocarbon based radicals containing from 1 to about 10 carbon atoms and hydroxyl substituted aliphatic, alicyclic and aromatic hydrocarbon based radicals containing from 2 to about 10 carbon atoms, $R_3$ is independently hydrogen or a radical selected from the group consisting of said radicals $R_1$ and $R_2$ and the radical

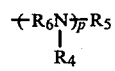

wherein each of $R_4$ and $R_5$ is independently hydrogen or a radical selected from the group consisting of the radicals $R_1$ and $R_2$, $R_6$ is an alkylene radical containing from 1 to about 10 carbon atoms and p is an integer ranging from about 2 to about 8 for use in curing epoxy resins.

23. A composition in accordance with claim 22 wherein the polyvalent metal salt, (A), is prepared by the reaction of a phosphorus sulfide with a phenolic compound corresponding to the general formula

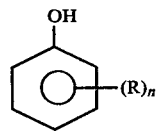

wherein R is hydrogen or a radical selected from the group consisting of straight chain or branched chain aliphatic-hydrocarbon based radicals containing from about 1 to about 12 carbon atoms and n is an integer ranging from 1 to 5.

24. A composition in accordance with claim 23 wherein R is selected from the group consisting of straight chain and brached chain aliphatic radicals containing 7 carbon atoms.

25. A composition in accordance with claim 23 wherein the polyvalent metal salt, (A), is a zinc salt.

26. A composition in accordance with claim 23 wherein the amine compound, (B), corresponds to the general formula

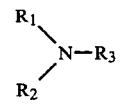

wherein $R_1$, $R_2$ and $R_3$ are the same or different radicals selected from the group consisting of straight chain and branched chain aliphatic hydrocarbon based radicals containing from 1 to about 10 carbon atoms and hydroxyl substituted straight chain and branched chain aliphatic hydrocarbon radicals containing from 2 to about 10 carbon atoms provided that at least one of said $R_1$, $R_2$ and $R_3$ of the amine compound of (B) are said hydroxyl substituted radicals.

27. A composition in accordance with claim 26 wherein each $R_1$, $R_2$ and $R_3$ of the amine compound (B) are said hydroxyl substituted radicals.

28. A composition in accordance with claim 27 wherein each of said hydroxyl substituted radicals $R_1$, $R_2$ and $R_3$ contain from 2 to about 6 carbon atoms.

29. A method for curing epoxy resins comprising forming a mixture of said epoxy resins with a composition comprising the reaction product of (A) a polyvalent metal salt of a phosphorodithioic acid prepared by the reaction of a phosphorus sulfide with hydroxyl group containing compounds corresponding to the general formula

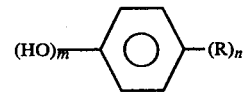

wherein R is a hydrocarbon based radical containing from about 1 to about 100 carbon atoms; m is an integer ranging from 1 to about 3 and n is an integer ranging from 1 to about 5 with the proviso that the sum of m+n does not exceed 6 with (B) an amine compound corresponding to the general formula

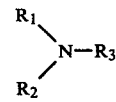

wherein each of $R_1$ and $R_2$ is independently hydrogen or a radical selected from the group consisting of hydrocarbon based radicals containing from 1 to about 20 carbon atoms and hydroxyl substituted hydrocarbon based radicals containing from 2 to about 20 carbon atoms, $R_3$ is independently hydrogen or a radical selected from the group consisting of said radicals $R_1$ and $R_2$ and the radical

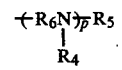

wherein each of $R_4$ and $R_5$ is independently hydrogen or a radical selected from the group consisting of said radicals $R_1$ and $R_2$, $R_6$ is a divalent hydrocarbon based radical containing from 1 to about 18 carbon atoms and p is an integer ranging from 1 to about 10 and heating said mixture at a temperature ranging from about 50° C. to about 300° C.

30. A method in accordance with claim 29 where the epoxy resin is selected from the group consisting of aliphatic-aromatic, aliphatic and cycloaliphatic epoxy resins.

31. A method in accordance with claim 30 wherein the epoxy resin is an aliphatic-aromatic epoxy resin prepared by the reaction of a bis(hydroxyaromatic)alkane with a halogen-substituted aliphatic epoxide.

32. A method in accordance with claim 29 wherein the polyvalent metal salt of the phosphorodithioic acid, (A), is prepared by the reaction of a phosphorus sulfide with a phenolic compound corresponding to the general formula

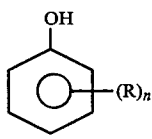

wherein R is a hydrocarbon based radical selected from the group consisting of aliphatic, alicyclic and aromatic hydrocarbon based radicals containing from about 1 to about 70 carbon atoms and n is an integer ranging from 1 to 5.

33. A method in accordance with claim 29 wherein the amine compound, (B), corresponds to the general formula

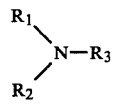

wherein each of $R_1$ and $R_2$ is independently hydrogen or a radical selected from the group consisting of aliphatic, alicyclic and aromatic hydrocarbon based radicals containing from 1 to about 10 carbon atoms and hydroxyl substituted aliphatic, alicyclic and aromatic hydrocarbon based radicals containing from about 2 to about 10 carbon atoms, $R_3$ is independently hydrogen or a radical selected from the group consisting of said radicals $R_1$ and $R_2$ and the radical

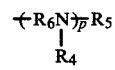

wherein each of $R_4$ and $R_5$ is independently hydrogen or a radical selected from the group consisting of said radicals $R_1$ and $R_2$, $R_6$ is an alkylene radical containing from 1 to about 10 carbon atoms and p is an integer ranging from about 2 to about 8.

34. A method for curing epoxy resins selected from the group consisting of aliphatic-aromatic, aliphatic and cycloaliphatic epoxy resins comprising forming a mixture of said epoxy resin with a composition comprising the reaction product of (A) a polyvalent metal salt of a phosphorodithioic acid prepared by the reaction of a phosphorus sulfide with a phenolic compound corresponding to the general formula

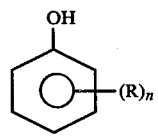

wherein R is hydrogen or a hydrocarbon based radical selected from the group consisting of aliphatic, alicyclic and aromatic hydrocarbon based radicals containing from about 1 to about 70 carbon atoms and where n is an integer ranging from 1 to 5 with (B) an amine compound corresponding to the general formula

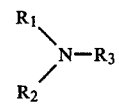

wherein each of $R_1$ and $R_2$ is independently hydrogen or a radical selected from the group consisting of aliphatic, alicyclic and aromatic hydrocarbon base radicals containing from 1 to about 10 carbon atoms and hydroxyl substituted aliphatic, alicyclic and aromatic hydrocarbon based radicals containing from 2 to about 10 carbon atoms, $R_3$ is independently hydrogen or a radical selected from the group consisting of said radicals $R_1$ and $R_2$ and the radical

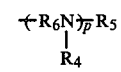

wherein each of $R_4$ and $R_5$ is independently hydrogen or a radical selected from the group consisting of said radicals $R_1$ and $R_2$, $R_6$ is an alkylene radical containing from 1 to about 10 carbon atoms and p is an integer ranging from about 2 to about 8 and having said mixture at a temperature ranging from about 100° C. to about 250° C.

35. A method in accordance with claim 34 wherein the polyvalent metal salt, (A), is prepared by the reaction of a phosphorus sulfide with hydroxyl group containing compounds corresponding to the general formula

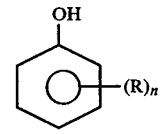

wherein R is a radical selected from the group consisting of straight chain and branched chain aliphatic hydrocarbon based radicals containing from 1 to about 12 carbon atoms.

36. A method in accordance with claim 35 wherein R is selected from the group consisting of straight chain and branched chain aliphatic radicals containing 7 carbon atoms.

37. A method in accordance with claim 34 wherein the polyvalent metal salt, (A), is a zinc salt.

38. A method in accordance with claim 34 wherein the amine compound, (B), is a compound corresponding to the general formula

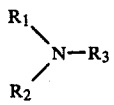

wherein $R_1$, $R_2$ and $R_3$ are the same or different radicals selected from the group consisting of straight chain and branched chain aliphatic hydrocarbon based radicals containing from 1 to about 10 carbon atoms and hydroxyl substituted straight chain and branched chain aliphatic hydrocarbon radicals containing from 2 to about 10 carbon atoms provided that at least one of said $R_1$, $R_2$ and $R_3$ of the amine compound of (B) are said hydroxyl substituted radicals.

39. A method in accordance with claim 38 wherein each of $R_1$, $R_2$ and $R_3$ of the amine compound (B) are said hydroxyl substituted radicals.

40. A method in accordance with claim 39 wherein each of said hydroxyl substituted radicals $R_1$, $R_2$ and $R_3$ contain from 2 to about 6 carbon atoms.

41. A method in accordance with claim 34 wherein the epoxy resin is an aliphatic-aromatic epoxy resin prepared by the reaction of a bis(hydroxyaromatic)alkane with a halogen substituted aliphatic epoxide.

42. An article having a cured epoxy resin coating adhered thereto, said resin coating derived from a curable epoxy resin composition in accordance with any one of claims 1 through 18.

43. A molded article prepared from a curable epoxy resin composition in accordance with any one of claims 1 through 18.

44. An adhesive prepared from a curable epoxy resin in accordance with any one of claims 1 through 18.

* * * * *